United States Patent [19]

Margotte et al.

[11] 3,954,905

[45] May 4, 1976

[54] MOULDING COMPOSITION OF A POLYCARBONATE, A GRAFT COPOLYMER AND A COPOLYMER AND MOULDED ARTICLES THEREFROM

[75] Inventors: Dieter Margotte, Krefeld;
Karl-Heinz Ott, Leverkusen;
Hermann Schirmer, Krefeld;
Günther Kämpf, Krefeld-Bockum;
Günter Peilstöcker,
Krefeld-Bockum; Hugo Vernaleken,
Krefeld-Bockum, all of Germany

[73] Assignee: Bayer Aktiengesellschaft, Germany

[22] Filed: Jan. 7, 1975

[21] Appl. No.: 539,165

Related U.S. Application Data

[63] Continuation of Ser. No. 421,646, Dec. 3, 1973, abandoned.

[30] Foreign Application Priority Data

June 9, 1973 Germany............................ 2329548
Oct. 25, 1973 Germany............................ 2353382

[52] U.S. Cl. .................................................. 260/873
[51] Int. Cl.² ........................................ C08G 39/10
[58] Field of Search ...................... 260/873, 47 XA

[56] References Cited

UNITED STATES PATENTS

| | | | |
|---|---|---|---|
| 3,130,177 | 4/1964 | Grabowski | 260/45.5 |
| 3,334,154 | 8/1967 | Kim | 260/860 |
| 3,663,471 | 5/1972 | Schirmer et al. | 260/40 |

FOREIGN PATENTS OR APPLICATIONS

| | | | |
|---|---|---|---|
| 1,182,807 | 4/1970 | United Kingdom | 260/873 |
| 1,810,993 | 6/1970 | Germany | |

*Primary Examiner*—Murray Tillman
*Assistant Examiner*—T. Pertilla
*Attorney, Agent, or Firm*—Connolly and Hutz

[57] ABSTRACT

Thermoplastic moulding composition composed of

A. 10 – 50 parts of a graft copolymer of styrene, methylmethacrylate or mixtures and acrylonitrile or acrylic acid esters onto a butadiene homo- or copolymer having a particle size of 0.05 to 0.19 $\mu$, B. 80 – 10 parts by weight of a copolymer of
  a. 50 – 90 % by weight of styrene and/or α-methylstyrene,
  b. 10 – 50 % by weight of acrylonitrile and/or acrylic acid ester, and C. 10 – 80 parts by weight of polycarbonate.

5 Claims, No Drawings

MOULDING COMPOSITION OF A POLYCARBONATE, A GRAFT COPOLYMER AND A COPOLYMER AND MOULDED ARTICLES THEREFROM

CROSS-REFERENCE TO RELATED APPLICATION

This application is a continuation of application Ser. No. 421,646 filed Dec. 3, 1973 and now abandoned.

Thermoplastic compositions of the following constitution, among others, have been disclosed in German Offenlegungsschrift No. 1,810,993:

A. 10 – 50 % by weight of a graft polymer in which 40 – 90 % by weight of a mixture of (1) styrene and/or α-methylstyrene and (2) acrylonitrile and/or acrylic acid esters has been grafted onto 10 – 60 % by weight of a diene rubber, B. 8 – 10 % by weight of a copolymer of (1) styrene and/or α-methylstyrene and (2) acrylonitrile and/or acrylic acid esters, and C. 10 – 80 % by weight of polycarbonate.

These thermoplastic compounds have high impact strength and great hardness and can in many cases be used instead of metals.

The compositions are not suitable for injection moulding because an article made in this way breaks often already on release from the mould, the fracture occurring along those lines where separate streams of the molten composition meet in the mould. These lines are subsequently referred to as weld lines.

It is an object of this invention to modify the above referred to moulding compositions so that they can be processed by injection moulding to yield moulded articles having high weld line strength.

The object is achieved generally speaking by a thermoplastic moulding composition of A. 10 – 50 parts by weight of graft copolymer of 10 – 35 parts by weight of a mixture of
  a. 50 – 90 % by weight of styrene, methylmethacrylate or mixtures thereof and
  b. 10 – 50 % by weight of acrylonitrile and/or acrylic acid ester graft polymerised on 65 – 90 % by weight of a butadiene homopolymer or a copolymer containing up to 30 % by weight of styrene, the graft copolymer consisting of particles measuring 0.05 – 0.19 μ, B. 80 – 10 parts by weight of a copolymer of
  a. 50 – 90 % by weight of styrene and/or α-methylstyrene and
  b. 10 – 50 % by weight of acrylonitrile and/or acrylic acid ester, and C. 10 – 80 parts by weight of polycarbonate.

The graft copolymers (A) are generally prepared by polymerising the monomers (a) styrene and/or methylmethacrylate and (b) acrylonitrile and/or acrylic acid esters in the presence of a latex of the butadiene homopolymer or copolymer, generally in the presence of radical initiators. Acrylic acid esters are preferably $C_1 - C_6$ alkyl esters of acrylic and methacrylic acid, most preferably methyl methacrylate. The polymer particles in the latices of butadiene homopolymers or copolymers must have a size of 0.05 to 0.19 μ, preferably 0.08 to 0.12 μ. The particles are at first not substantially increased in size by the graft polymerisation. Only when the graft polymer consists of particles of this size and provided the quantity of grafted monomers is within the range indicated above, a moulding composition having high weld line strength is obtained.

Methods of preparing the graft copolymers are already known. The usual graft polymerisation processes starting from a latex of the grafting base may be used. A suitable process has been described, for example, in British Pat. No. 794,400.

The copolymers (B) and methods of preparing them are also known in the art. Here again the method described in British Pat. No. 794,400 may be used.

The moulding compositions of this invention may in principle contain any thermoplastic polycarbonates (C). Suitable polycarbonates are known in the art. They are generally prepared by reacting dihydroxy or polyhydroxy compounds with phosgene or diesters of carbonic acid. Particularly suitable dihydroxy compounds are the dihydroxy diarylalkanes, including those which carry alkyl groups or chlorine or bromine atoms in the ortho position to the hydroxyl group. The following dihydroxydiarylalkanes are preferred: 4,4'-Dihydroxy-diphenylpropane, 2,2 (Bis-phenol A), tetramethylbisphenol A, tetrachlorobisphenol A, tetrabromobisphenol A and bis-(4-hydroxyphenyl)-p-diisopropylbenzene. Branched polycarbonates are also suitable. To prepare these, part of the dihydroxy compound, e.g. 0.2 to 2 mols percent, is replaced by a polyhydroxy compound. The following are examples of suitable polyhydroxy compounds: 1,4-Bis-(4', 4,2'-dihydroxy-triphenylmethyl)-benzene, phloroglucinol,4,6-dimethyl-2,4,6-tri-(4-hydroxyphenyl)-heptene-2; 4,6-dimethyl-2,4,6tri-(4-hydroxyphenl)-heptane, 1,3,5-tri-(4-hydroxyphenyl)-benzene, 1,1,1-tri-(4-hydroxyphenyl)-ethane and 2,2-bis-[4,4-(4,4'-dihydroxydiphenyl)-cyclohexyl]-propane.

Polycarbonates of this kind have been described in U.S. Pat. Nos. 3,028,365; 2,999,835; 3,148,172; 3,271,368; 2,970,137; 2,991,273; 3,271,367; 3,280,078; 3,014,891 and 2,999,846. The polycarbonates preferably have molecular weights of 10,000 to 60,000 and in particular 20,000 to 40,000.

In a preferred embodiment a mixture of two polycarbonates is used. This mixture contains 50 – 85 % by weight of a polycarbonate made from a halogen free polyphenol and 15 – 50 % by weight of a high molecular weight halogen containing polycarbonate of the formula

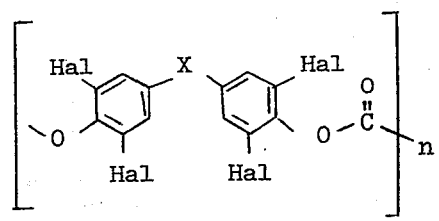

wherein
$n$ = 15 to 200
X = alkylene or alkylidene having 1 – 5 carbon atoms; cycloalkylene or cycloalkylidene having 5 –15 carbon atoms; a single bond; — O — or

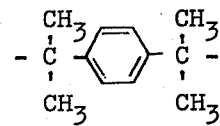

Hal = chlorine or bromine.

The final moulding compositions of this embodiment contain preferably 10 to 30 % by weight of the halogen containing polycarbonate.

As shown by the formula, such halogen containing polycarbonates are based on phenols containing at least two benzene nuclei and carrying 4 halogen (chlorine, bromine) atoms. The molecular weights of such polycarbonates are preferably from 16,000 to 35,000. When these polycarbonate mixtures are used the thermal stability and moduli of elasticity found in the products are exceptionally high.

The moulding compositions can be prepared from components A, B and C by mixing them in known mixing apparatus, for example on mixing rollers or in double screw extruders and internal mixers. Alternatively, latices of graft copolymer (A) and copolymer (B) may first be mised, the solids isolated from the mixture and the solids mixture may then be added to the polycarbonate. Fillers, glass fibres, pigments or other additives such as stabilisers, flameproofing agents, flow improvement agents, lubricants, mould release agents and antistatic agents may be added when mixing the components.

Particularly suitable moulding compositions have a butadiene homopolymer or copolymer content of 5 to 25 % by weight, and in particular weld line strengths of the order of 10 cm kp/cm² are obtained at butadiene contents (as homopolymer or copolymer) of about 10 % by weight.

EXAMPLES 1 – 6

Polymer components a. Aromatic polycarbonate based on bisphenol A prepared by the phase interface process and having a relative viscosity of $\eta_{rel} = 1.28$ (determined in methylene chloride at 25°C at a concentration of 5 g/l).

b. Aromatic polycarbonate based on 90 mols % of bisphenol A and 10 mols % of tetrabromobisphenol A prepared by the phase interface process and having a relative viscosity of $\eta_{rel}=1.30$.

c. Aromatic polycarbonate based on 82 mols % of bisphenol A and 18 mols % of tetrachlorobisphenol A prepared by the phase interface process and having a relative viscosity of $\eta_{rel} = 1.29$.

d. Mixture of
1. 18.75 parts by weight of a graft polymer prepared by grafting 16 parts by weight of styrene and 4 parts by weight of acrylonitrile on 80 parts by weight of a polybutadiene latex which has an average particle diameter of 0.05 to 0.1 μ and
2. 81.25 parts by weight of a styrene/acrylonitrile copolymer with a styrene/acrylonitrile ratio of 70 : 30 and an intrinsic viscosity of $[\eta] = 79.4$ (determined in dimethylformamide at 20°C).

e. Mixture of
1. 25 parts by weight of a graft polymer prepared by grafting 16 parts by weight of styrene and 4 parts by weight of acrylonitrile on 80 parts by weight of a polybutadiene latex with an average particle diameter of 0.05 to 0.1 μ and
2. 75 parts by weight of a copolymer of 70 % by weight of styrene and 30 % by weight of acrylonitrile with an intrinsic viscosity of $[\eta] = 80.0$ (determined in DMF at 20°C).

f. Mixture of
1. 31.25 parts by weight of a graft polymer prepared by grafting 15 parts by weight of styrene and 5 parts by weight of acrylonitrile on 80 parts by weight of a polybutadiene latex with an average particle diameter of 0.05 to 0.1 μ and
2. 68.75 parts by weight of a styrene/acrylonitrile copolymer having a styrene/acrylonitrile ratio of 70 : 30, $[\eta] = 0.78$ (determined in DMF at 20°C).

Polycarbonates a) to c) are homogenised with mixtures d) to f) in internal kneaders or double screw extruders at temperatures of 200° to 260°C and extruded.

The constitutions of the moulding compositions obtained in this way and their main physical properties are summarised in Table I.

Table I

| | | Example 1 | Example 2 | Example 3 | Example 4 | Example 5 | Example 6 |
|---|---|---|---|---|---|---|---|
| Polycarbonate (a) | Parts by weight | 40 | 40 | 40 | — | 20 | 30 |
| Polycarbonate (b) | " | — | — | — | 50 | — | — |
| Polycarbonate (c) | " | — | — | — | — | 30 | 30 |
| Mixture (d) | " | 60 | — | — | 50 | — | — |
| Mixture (e) | " | — | 60 | — | — | 50 | — |
| Mixture (f) | " | — | — | 60 | — | — | 50 |
| Grafted monomers % by weight | | 11.25 | 15 | 18.7 | 9.4 | 12.5 | 12.4 |
| Polybutadiene content % by weight | | 9.0 | 12 | 15 | 7.5 | 10 | 10 |
| Elongation at break % (DIN 53 455) | | 60 | 62 | 68 | 74 | 71 | 68 |
| Modulus of elasticity kp/cm²(DIN 53455) | | 23 000 | 22 400 | 19 800 | 23 200 | 22 000 | 22 600 |
| Impact strength cmkp/cm² (DIN 53 453) | | | not broken | | | not broken | |
| Notched impact strength cmkp/cm² (DIN 53 453) | | 30 | 34 | 36 | 25 | 28 | 25 |
| WLS[1] (based on DIN 53 453) | | 9 | 12 | 14 | 12 | 13 | 12 |
| Vicat A (DIN 53 460) °C | | 135 | 130 | 130 | 140 | 142 | 144 |
| Vicat B (DIN 53 460) °C | | 116 | 115 | 116 | 123 | 128 | 130 |

[1]Weld line strength was determined as follows: A small standard test bar is produced by injection moulding from two sides so that a weld line is formed down the middle of the bar. The impact strength is determined on this test bar in accordance with DIN 53 453.

EXAMPLE 7

1. Polycarbonate (component C)

Viscosities determined in methylenechloride at 25°C at a concentration of 5 g/l ($\eta_{rel}$); $M_w$ = molecular weight (weight average)

A) Bisphenol-A-polycarbonate
$\eta_{rel} = 1.30$
$M_w$ = ca. 31.000

B) Copolycarbonate of 80 mol-% bisphenol A and 20 mol-% tetrabromobisphenol A
$\eta_{rel} = 1.25$
$M_w$ = ca. 30.500

C) Low molecular tetrabromobisphenol-A-polycarbonate
$\eta_{rel} = 1.03$
$M_w$ = ca. 4.500

D) High molecular tetrabromobisphenol-A-polycarbonate
$\eta_{rel} = 1.08$
$M_w$ = ca. 16.000

E) High molecular tetrabromobisphenol-A-polycarbonate
$\eta_{rel} = 1.08$
$M_w$ = 35.000

-continued

F) Copolycarbonate of 84 mol-% bisphenol A and 16 mol-% of tetrachlorobisphenol A
$\eta_{rel} = 1.27$
$M_w = $ ca. 31.000

G) High molecular tetrachlorobisphenol-A-polycarbonate
$\eta_{rel} = 1.12$
$M_w = 23.000$ 2. Graft polymer/copolymer-mixtures (components A and B H) Mixture of
1. 18,75 parts by weight of a graft polymer made by grafting 16 parts by weight styrene and 4 parts by weight acrylonitrile onto 80 parts by weight of a small particle size polybutadiene in latex form having an average particle diameter of 0.05 to 0.1 μ and
2. 81.25 parts by weight of a styrene/acrylonitrile-copolymer having a styrene/acrylonitrile ratio of 70 : 30 and an intrinsic viscosity of [η] = 79.4 (determined in dimethylformamide at 20°C);

J. mixture of
1. 25 parts by weight of a graft polymer made by grafting 16 parts by weight styrene and 4 parts by weight acrylonitrile onto 80 parts by weight of a small particle size polybutadiene in latex form having an average particle diameter of 0.05 to 0.1 μ and
2. 75 parts by weight of a copolymer of 70 % by weight styrene and 30 % by weight acrylonitrile having an intrinsic viscosity of [η] = 80.0 (determined in dimethylformamide at 20°C);

K. mixture of
1. 31.25 parts by weight of a graft polymer, made by grafting 15 parts by weight styrene and 5 parts by weight acrylonitrile onto 80 parts by weight of a small particle size polybutadiene in latex form having an average particle diameter of 0.05 to 0.1 μ and
2. 68.75 parts by weight of a styrene/acrylonitrile-copolymer having a styrene/acrylonitrile ratio of 70 : 30 and an intrinsic viscosity of [η] = 0.78 (determined in dimethylformamide at 20°C).

The following table contains the mixtures of the invention which were made by mixing the components in an internal mixer and their physical data.

or methylmethacrylate or mixtures thereof and (b) 50 to 10 % of acrylonitrile and/or acrylic acid esters onto 90 to 65 parts of a butadiene homopolymer or copolymer with up to 30 % of styrene,
B. 80 to 10 parts of a copolymer of
   a. 50 to 90 % of styrene and/or α-methylstyrene and
   b. 50 to 10 % of acrylonitrile and/or acrylic acid ester(s) and
C. 10 to 80 parts of polycarbonate; all parts and percentages being by weight.

2. A thermoplastic moulding composition as claimed in claim 1 wherein the polycarbonate is a mixture of 50 to 85 % by weight of a polycarbonate made from a halogen free phenol and 15 to 50 % by weight of a halogen containing polycarbonate of recurring structural units of the formula

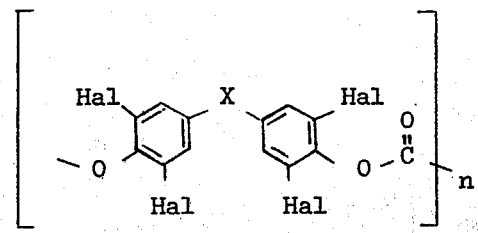

wherein
$n = $ 15 to 200
X = alkylene or alkylidene having 1 - 5 carbon atoms; cycloalkylene or cycloalkylidene having 5 - 15 carbon atoms; a single bond; - O -; or

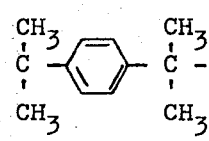

and Hal is chlorine or bromine.

3. A composition as claimed in claim 1 in which the graft copolymer particles A) have a particle size of 0.08

Table

| Example | 1 | 2 | 3 | 4 | 5 | 6 | 7 | 8 | 9 | 10 | 11 |
|---|---|---|---|---|---|---|---|---|---|---|---|
| polycarbonate A) | 40 | — | 32 | 32 | 30 | 50 | — | 30 | 30 | 60 | 40 |
| polycarbonate B) | — | 40 | — | — | — | — | — | — | — | — | — |
| polycarbonate C) | — | — | 8 | — | — | — | — | 20 | — | — | — |
| polycarbonate D) | — | — | — | 8 | — | — | — | — | — | 10 | — |
| polycarbonate E) | — | — | — | — | 30 | — | — | — | — | — | — |
| polycarbonate F) | — | — | — | — | — | — | 50 | — | — | — | — |
| polycarbonate G) | — | — | — | — | — | — | — | — | 20 | — | 30 |
| mixture H) | 60 | 60 | 60 | 60 | — | — | — | — | — | — | — |
| mixture J) | — | — | — | — | 40 | — | — | — | — | 30 | 30 |
| mixture K) | — | — | — | — | — | 50 | 50 | 50 | 50 | — | — |
| notched impact strength cmkp/cm² | 30 | 29 | 29 | 31 | 30 | 33 | 29 | 29 | 30 | 30 | 30 |
| modulus of elasticity[x] kp/cm² | 23.000 | 22.500 | 22.600 | 27.000 | 29.000 | 22.000 | 22.400 | 22.700 | 26.800 | 27.000 | 28.100 |
| Vicat B[xx] °C | 116 | 115 | 116 | 122 | 125 | 114 | 115 | 114 | 124 | 124 | 126 |

[x]determined according to DIN 53 455
[xx]determined according to DIN 53 460

We claim:
1. A thermoplastic moulding composition of:
A. 10 to 50 parts of a graft polymer which has a particle size of 0.05 to 0.19 μ the graft copolymer having been prepared by grafting 10 to 35 parts of a mixture composed of (a) 50 to 90 % of styrene, to 0.12 μ.

4. A composition as claimed in claim 1 which contains 5 to 25 % of butadiene homopolymer or copolymer.

5. Injection moulded articles when made from a composition as claimed in claim 1.

* * * * *